US012385624B2

(12) United States Patent
Johnson et al.

(10) Patent No.: US 12,385,624 B2
(45) Date of Patent: Aug. 12, 2025

(54) STORYTELLER DEVICE HAVING SYNCHRONIZED LIGHT PROJECTION AND AUDIO PLAYBACK OF RECORDED STORIES

(71) Applicant: BTL DIFFUSION SARL, Mere (FR)

(72) Inventors: Jeffery Wayne Johnson, Lawndale, CA (US); Rafi Lankry, Ness Ziona (IL); Laurent Benichou, Saint-Cloud (FR)

(73) Assignee: BTL DIFFUSION, Galluis (FR)

( * ) Notice: Subject to any disclaimer, the term of this patent is extended or adjusted under 35 U.S.C. 154(b) by 12 days.

(21) Appl. No.: 18/384,767

(22) Filed: Oct. 27, 2023

(65) Prior Publication Data

US 2024/0255121 A1 Aug. 1, 2024

Related U.S. Application Data

(60) Provisional application No. 63/441,811, filed on Jan. 29, 2023.

(51) Int. Cl.

| | |
|---|---|
| ***F21V 14/00*** | (2018.01) |
| ***F21V 3/02*** | (2006.01) |
| ***F21V 7/04*** | (2006.01) |
| *F21W 121/00* | (2006.01) |
| *F21Y 113/00* | (2016.01) |
| *F21Y 115/10* | (2016.01) |

(52) U.S. Cl.

CPC .............. *F21V 14/006* (2013.01); *F21V 3/02* (2013.01); *F21V 7/041* (2013.01); *F21W 2121/008* (2013.01); *F21Y 2113/00* (2013.01); *F21Y 2115/10* (2016.08)

(58) Field of Classification Search

CPC ...... A63H 33/006; A63H 33/26; F21V 14/006
See application file for complete search history.

(56) References Cited

U.S. PATENT DOCUMENTS 11,797,247 B2 * 10/2023 Ballhatchet ............... G06F 3/14
2021/0286577 A1 * 9/2021 Ballhatchet ........... G06F 3/0362

* cited by examiner

*Primary Examiner* — Karabi Guharay
(74) *Attorney, Agent, or Firm* — LAZARIS IP

(57) ABSTRACT

A children's toy, and electronic device, plays audio files and projects differently-colored light patterns onto a surface in a room in which the device is placed. The light patterns are projected in synchronization with the playback of such audio files. The device allows users to select from different nature sounds, different melodies, or multiple pre-recorded children's stories. The device also enables users to record their own stories for each of several environments, and playback their custom stories together with projections of light in each environment.

25 Claims, 5 Drawing Sheets

STORYTELLER DEVICE HAVING SYNCHRONIZED LIGHT PROJECTION AND AUDIO PLAYBACK OF RECORDED STORIES

CROSS-REFERENCE TO RELATED PATENT APPLICATION(S)

This patent application claims priority to U.S. provisional patent application 63/441,811, filed on Jan. 29, 2023, the contents of which are incorporated in its entirety herein. In accordance with 37 C.F.R. § 1.76, a claim of priority is included in an Application Data Sheet filed concurrently herewith.

FIELD OF THE INVENTION

The present invention relates to toys, and to light projection devices for children. Specifically, the present invention relates to a device and child's toy that includes an audio storyteller function that plays a story about a selected character in a selected environment. The device projects light patterns or pictures, which may change to represent different environments that are timed to match events in each story.

BACKGROUND OF THE INVENTION

The prior art includes many examples of both audio storytellers and light projection devices configured as toys for children. Some existing prior art toys have both functions—playback of pre-recorded sounds, and displays of light provided by light-emitting elements. Still other toys have the ability to project specific patterns of light from such light-emitting elements, with or without also having the ability to play sounds.

There are no existing devices, however, that have the ability to project light in a specific pattern that is synchronized with playback of specific sounds such as pre-recorded audio files in the form of stories. Further, there are no existing devices which project light in synchronization with audio files where children select both a character and an environment for their story, where the device then plays a story about the selected character in the selected environment, all synchronized with particular and different projected patterns of emitted light that are timed to events in each story. Also, there are no existing devices in which, at specific points within recorded stories, the light, colors, and timing of light-emitting members may change in synchronization with actions in the those recorded stories. Still further, there are no existing devices in which users (either parents or children) have the ability to record their own stories, and play back those stories with patterns of emitted light selected for those stories. Accordingly, there are unmet needs in the existing art for devices configured with all of these functions.

BRIEF SUMMARY OF THE INVENTION

The present invention is an electronic device that plays audio files, and projects differently colored light patterns, onto surfaces in environments in which the device is placed, such as onto the ceiling of a room. The light patterns are projected in synchronization with the playback of such audio files. The device allows users to select from different nature sounds, different melodies, or multiple pre-recorded children's stories.

Users (typically children) select a character from one of several pre-identified different characters (or melodies or nature sounds), and then also choose an environment from one of several different pre-identified environments. Together, these selections represent a pre-recorded story. Users then press a "Start" button and the audio file(s) comprising the pre-recorded story begins to play. A timer also starts to count to create a simultaneous light projection. At different points during playback of such a pre-recorded story, the light pattern and color changes. These colors and lighting patterns may also overlap with each other. Regardless, the colors and light patterns projected, and timing thereof are done in synchronization with actions in the selected pre-recorded story being played, and at specific points in such selected pre-recorded stories.

The device also allows users to create and save their own stories. The device therefore is capable of recording and storing audio files, and allowing users to play their own recorded stories with patterns of emitted light selected by the users.

The synchronization between audio files for recorded stories and the lights, colors, and timing of projected light patterns creates an immersive experience that is unlike any other product available. Users of the device, who are mainly children, are surrounded by these colored, projected light patterns that change to match the action in each recorded story.

For example, if a character in a story walks from the Seashore into the Forest, the light pattern in the physical world will be synchronized to this change. The child listening to the story is immediately surrounded by a projected canopy of green leaves, as if they were walking into the forest with the character.

This synchronization of light, color, and sound elevates the listening experience and is unique among existing devices.

Objectives, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention is a device, comprising a child's toy, that projects light emitted from within a housing in synchronization with an audio playback of recorded stories. The recorded stories include characters, melodies, and environments that are selected by a user of the device.

Figure 1:
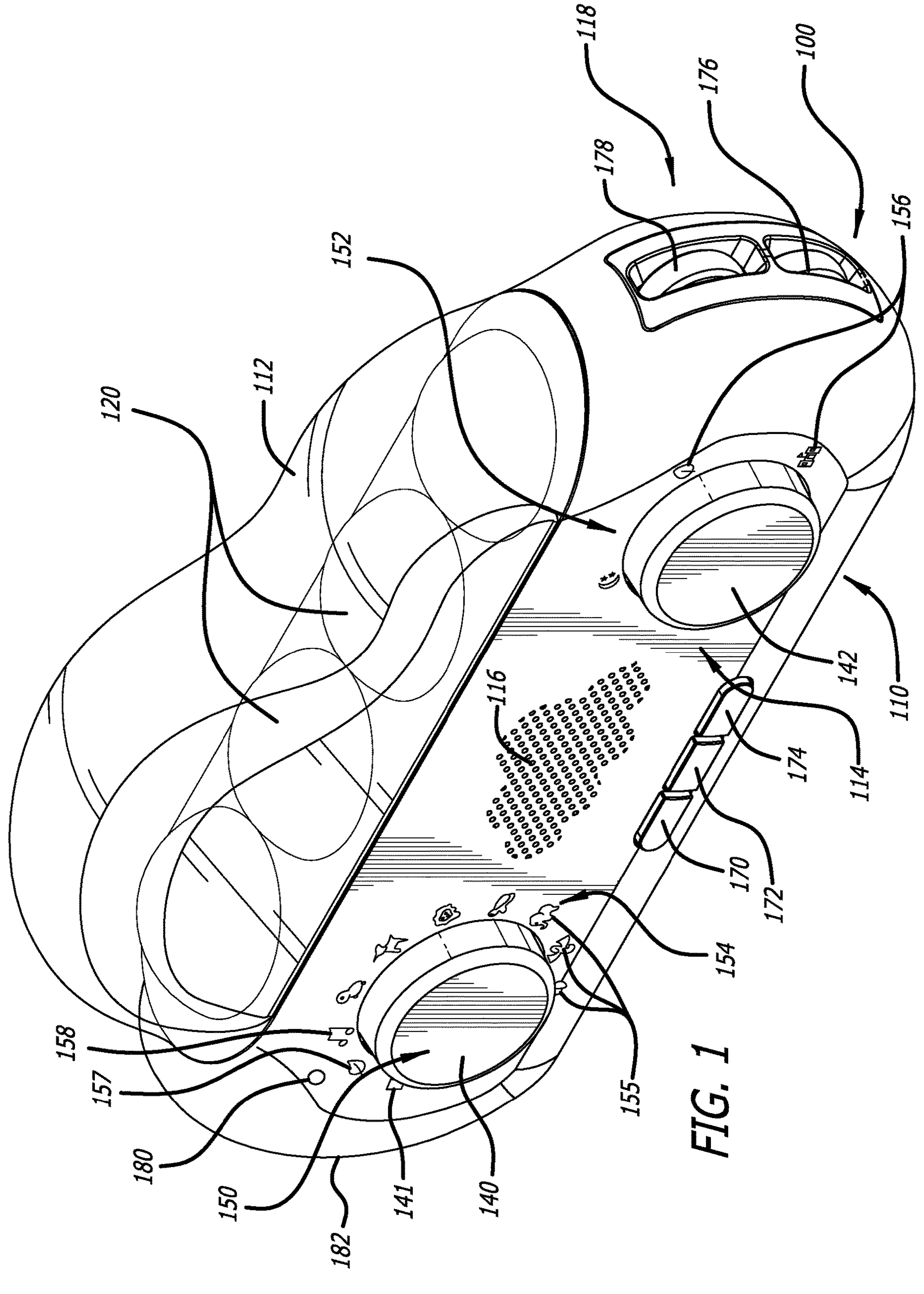
FIG. 1 is a top, front, and right-side perspective view of a device according to the present invention.
Figure 3:
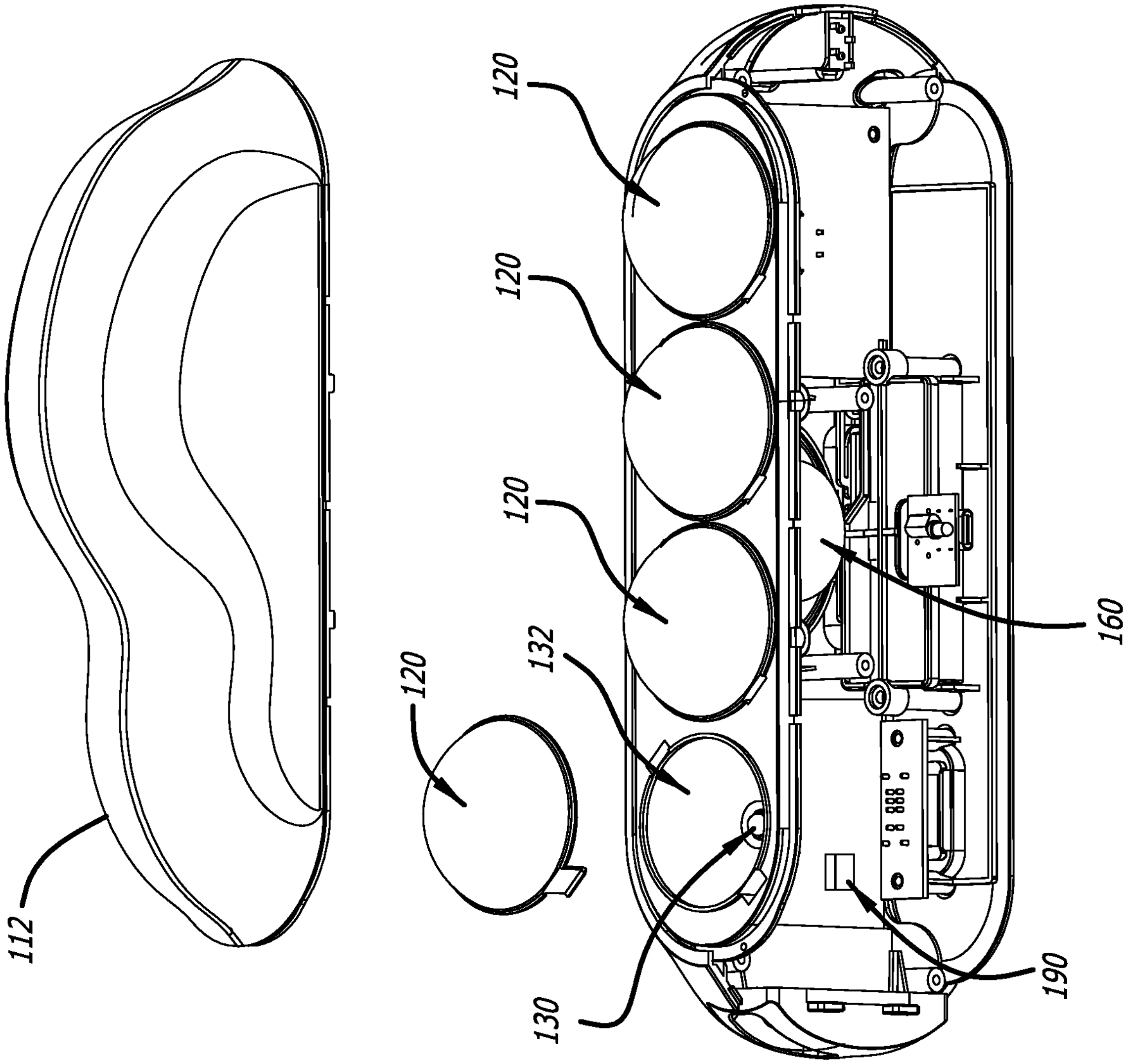
FIG. 3 is a perspective view of internal components of the device of FIG. 1, according to the present invention.
Figure 4:
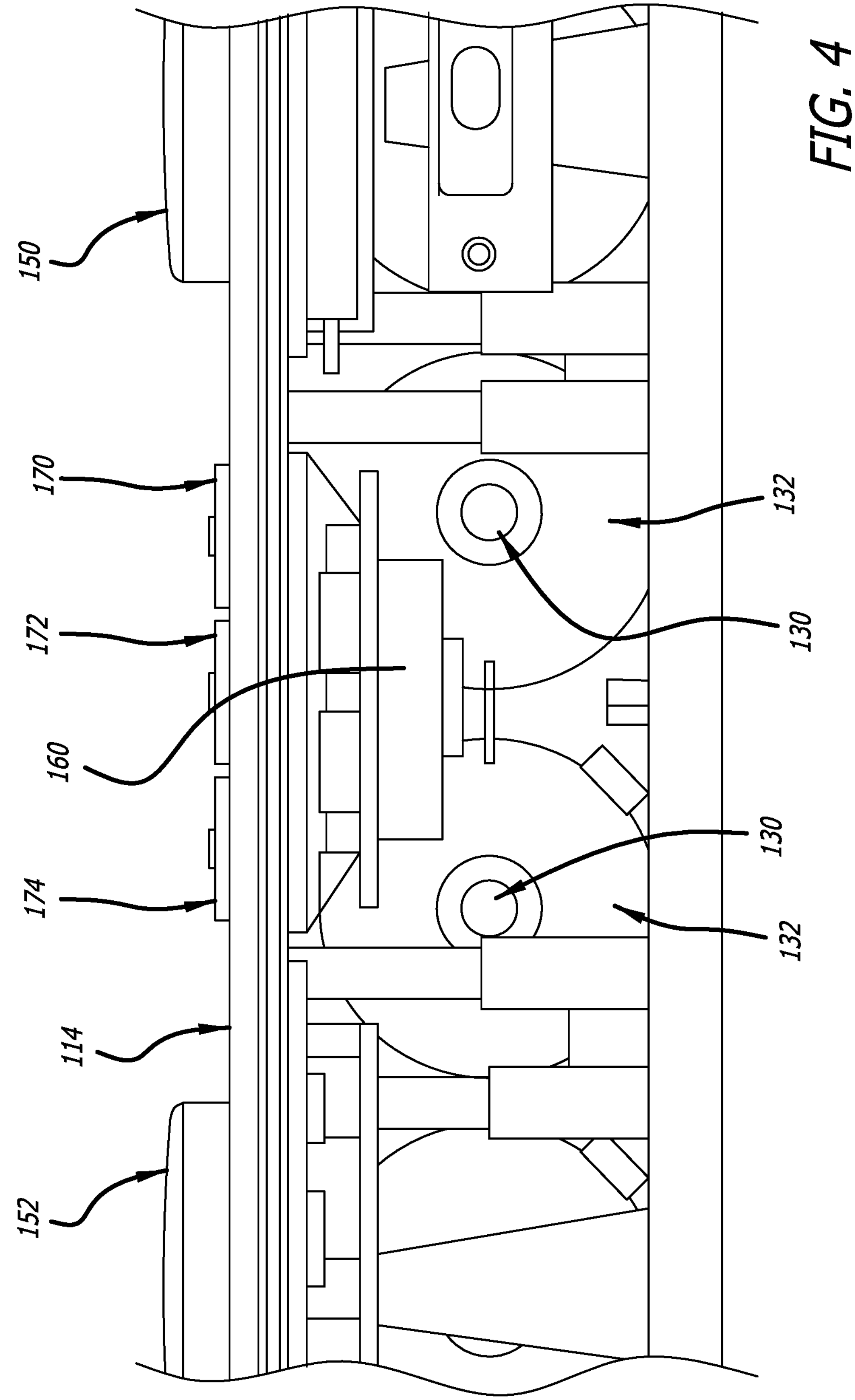
FIG. 4 is top view of internal components of the device of FIG. 1, according to the present invention.
Figure 5:
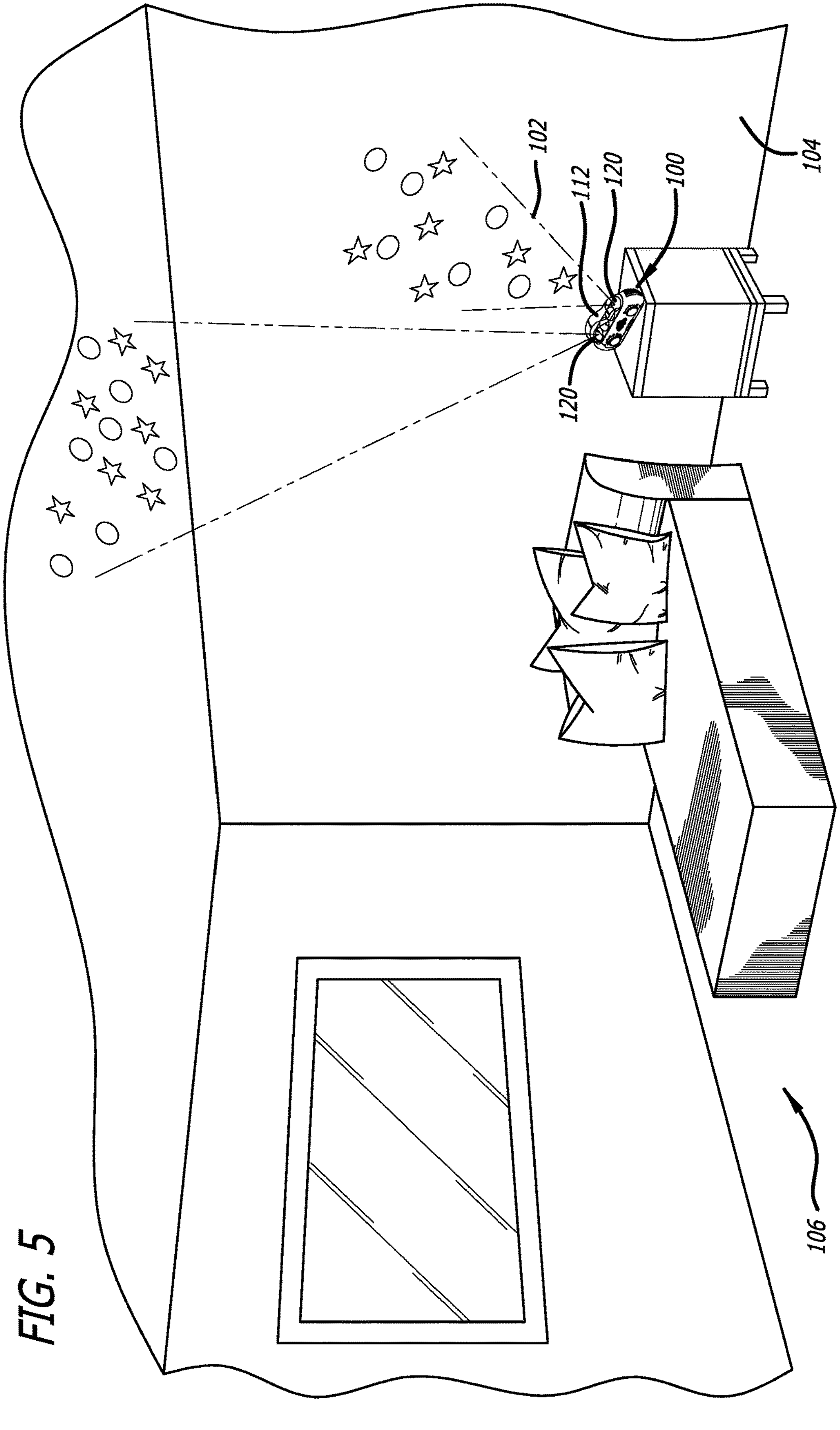
FIG. 5 is a view of the children's toy and electronic device of the present invention in operation and when placed in a room for a projection of emitted light.

FIG. 1 is a perspective illustration of one embodiment of such a device 100. FIG. 3 is a perspective view of various components of the device 100, and FIG. 4 is a top view looking into internal components of the device 100. FIG. 5 is an illustration of the device in operation when placed in a room or other indoor setting.

The device 100 includes a main housing 110 that is generally opaque, but has a clear or translucent top portion 112 that may have a shape in the form of a cloud. The top portion 112 enables light 102 to be emitted from the device 100 and projected onto an external surface, such as ceiling or wall 104, in an environment such as a room 106 in which the device 100 is placed. One or both of the housing 110 and the top portion 112 may be made of a plastic or plastic-like material such as polyethylene or polypropylene, polystyrene, and may also be made from plastics that are manufactured from natural and renewable sources. Further, at least the housing 110 may be molded using either a recycled plastic or a bio-composite plastic. It is to be understood however that any type of plastic material may be used to form either the housing 100 and the top portion 112, and therefore the present invention is not to be limited to any specific type of material referenced herein.

Regardless of the material, the type or composition of plastic used, or the method of forming the various parts of the housing 110 of the device 100, the housing 100 may also include multiple rubber "feet" on a bottom surface thereof, so that the device 100 is stable and does not transfer vibrations to any hard surfaces on which it is placed, which could create unwanted audio reverberation during operation thereof.

The device 100 of the present invention also includes several projector domes 120 within the housing 110 and under the top portion 112. In one embodiment of the present invention there are four such projector domes 120, but it is to be understood that the number of projector domes 120 may vary. Regardless, under each projector dome 120, and as indicated in FIG. 3 and FIG. 4, there may be placed at least one high-output light-emitting member 130 (such as a light-emitting diode (LED), having a color of green, blue, red or amber), surrounded by an inner cone 132. The light-emitting members 130 and inner cones 132 are, in effect, hidden from view from the outside looking into the housing 110, as indicated in FIG. 1. Each inner cone 132 is between each light-emitting member 130 and its corresponding projector dome 120, so that light 102 emitted from each light-emitting member 130 only illuminates the single projector dome 120 that it is positioned under and does not bleed out to contaminate the projection of light 102 from another projector dome 120. It is to be understood that in some embodiments, the present invention contemplates that multiple light-emitting members 130 may be placed under each projector dome 120. Therefore neither the present specification nor the claims are intended to be limited to any specific number of light-emitting members 130 placed under a projector dome 120.

The light-emitting members 130 may be centered under each projector dome 120, and may also be set at some distance below a level relative to a bottom of the projector domes 120. Also, each light-emitting member 130 may be set at a different distance below a level relative to a bottom of the projector domes 120. For example, if the projector domes 120 are roughly 1.5 cm tall, the light-emitting members 130 may be set below a base of each projector dome 120, roughly 3 cm from a top of the projector dome 120; in other words, sunken 1.5 cm lower than the baseline level relative to the projector dome 120 bottom. It is to be understood that this is an example only, and the light-emitting members 130 may be placed at any distance above or below the baseline level; additionally, the light-emitting members 130 may be centered or not centered, depending on the projection of emitted light 102 desired from each projector dome 120.

Additionally, in one exemplary configuration, each cone 132 may have a height of between 1.8 cm and 2.2 cm, and each projector dome 120 may have a height of between 1.1 cm and 1.5 cm. Each projector dome 120 attaches directly above each cone 132, such that a top of each light-emitting member 130 is approximately 3 cm from an inside surface of a top each projector dome 120. It is to be understood however that other heights and distances of such components of the device 100, and of such components relative to each other, are possible and within the scope of the present invention. It is to be further understood that neither the present specification, nor the claims, are to be limited to any particular heights or distances specifically discussed herein.

Each cone 132 may have a particular characteristic associated with it that further enables the plurality of light-emitting members to only illuminate the projector dome 120 under which it is positioned. Such a particular characteristic may be configured on an inside surface of each cone 132 that prevents the light from passing through a side of each cone, and also prevents the light from reflecting from the inside surface and outside a top of the cone 132. In one embodiment, the particular characteristic on the inside surface of each cone 132 is a matte finish that reflects less light and blocks the light from passing through a side of each cone 132. Alternatively, to achieve the same effect, instead of cones 132, cylinders, which do not reflect light upward, may be utilized to separate the light-emitting members 130 and block light 102 from passing through the sides of the cylinders.

It is to be understood that the inner cones 132 are components that allow the light-emitting members 130 to only illuminate the projector dome 120 under which they are positioned, and that these components may have any shape that accomplishes this purpose. As noted above, instead of having a cone shape, these components may be cylinders. In addition, each such component may have a different shape, such that they need not all have the same shape. Therefore, it is to be further understood that neither the present specification nor the claims are to be limited to any particular shape represented by the term or terms used for such components.

Projector domes 120 may be made of a clear plastic material, and coated with an opaque ink or other similar coating material that allows light 102 to pass through the clear areas, but not through the opaque areas. Each projector dome 120 may have a particular pattern printed on it, and this pattern may be different for each projector dome 120, such that a different pattern is projected when the light-emitting member 130 under each projector dome 120 is illuminated. Therefore, each projector dome 120 is able to project a different colored pattern onto external surfaces—such as the ceiling and walls 104—of any room 106 or other environment in which the device 100 is placed, and the timing of the illumination of each light-emitting member 130 under each projector dome 120 is synchronized with pre-recorded stories that are stored in and played back from the device 100. Alternatively, each projector dome 120 may have a pattern formed by cutting out or punching out portions of the projector dome 120 to create holes or perforations in the material comprising each projector dome 120. In this manner, the holes or perforations in the projector domes 120 allow for light projection by enabling light 102 to be emitted through each hole, and the shape of each hole helps to form the overall patten projected.

In addition, the device 100 may be configured so that each projector dome 120 rotates, either individually or together as a group, to create further enhancements in projected light 102 from each projector dome 120. Such rotation may also be in time synchronization with any melody or nature sound played in a recorded story, and with the tempo or cadence of a recorded story being played by the device 100.

It is to be understood that projector domes 120 are components that allow for specific light patterns, or pictures (as discussed below) to be projected by light-emitting members 130 from within the housing 110, and that these components may have any shape that accomplishes this purpose. For example, instead of being shaped like a dome, these components may have square or triangular shapes. In addition, each such component may have a different shape, such that they need not all have the same or similar shape. For example, each component may comprise one or more lenses having different shapes, and different characteristics allowing for different focusing effects. Therefore, it is to be further understood that neither the present specification nor the claims are to be limited to any particular shape represented by the term or terms used for such components.

The device 100 includes multiple actuators, which operate as selector knobs and buttons, for actuating the various functions thereof. For example, on a front face or panel 114 of the housing 110 of the device 100, two rotary/push button selector knobs 150 and 152 are positioned. Referring to FIG. 1, the left-sided knob 150 allows for selections from a twelve-position rotary switch with a single momentary button activated by pressing on the center of the knob 150. Turning the knob 150 to any of the identified positions selects that function. Pressing anywhere on the knob 150 may activate a story-related function, as described further below.

It is to be understood that a knob 150 or 152 may have any shape and turn or be actuated in any manner, and need not have rotational or depression capabilities. Nonetheless, the left-sided and right-sided knobs 150 and 152 on the housing 110 shall be described herein as being rotational, and capable of pushed or depressed, for ease of explanation. It is to be further understood that this specification, and the present invention, are not to be limited to any specific manner of actuating said buttons or said knobs 150 and 152.

The left-sided knob 150 may include several small icons 154 (or other similar indicia) that are printed around its circumference. FIG. 1 indicates several of such icons, but it is to be understood that this number may vary. In one example. 12 icons may be shown. Regardless of the number, each such icon 154 may be illuminated in some manner (for example, backlit) when selected. Each icon 154 may be associated with a light-emitting member separate from those under each projector dome 120. In one embodiment, illumination of these small icons 154 is activated electronically. The on-board central processing unit 190 records which icon 154 has been selected, and sends a signal to only illuminate that icon.

Alternatively, a physical opaque disc may be attached to the inside of a knob shaft, so that the entire field of icons would be illuminated with a smaller number of light-emitting members. Where this illumination is accomplished by the disc, the disc attached to the left-sided knob 150 may have a single opening cut into it, which aligns with a pointer indicator on the front of the knob 150. When the knob 150 is then pointed to an icon 154, the gap in an inner portion of the disc lines up with that icon 154 and allows light to pass through, illuminating only that particular icon 154.

The right-sided knob 152 may be attached to a multi-position rotary switch, and may also have a single momentary button activated by pressing on the knob 152. Turning the right-sided knob 152 to any of the positions selects that function. FIG. 1 indicates three of such positions, but it is to be understood that this is exemplary only, and that number may vary. Regardless of the number, the icons 156 around the right-sided knob 152 correspond to projection colors (for example, green, blue, red and amber) from the light-emitting members 130, and each icon 156 may be illuminated with a single matching color light-emitting member 130. The device 100 may further include a mechanism for keeping any light from bleeding over and illuminating the other icons 156, such as for example a molded light-isolating ring, or small cones or cups.

The device 100 may further include an audio playback apparatus 160, for example an audio speaker, as shown in FIG. 3 and FIG. 4. The audio speaker may comprise a single 2.25" paper cone magnetic speaker, aimed toward the front panel 114 of the housing 110, on the inside front of the device 100. The front panel 114 includes speaker cutouts 116 (shown in the shape of a cloud in FIG. 1) to allow sound from the audio playback apparatus 160 to be emitted from the device 100. Other types of speakers are also possible and contemplated to achieve sound quality, and within the scope of the present invention. Any other shape formed by the speaker cutouts 116 may also be utilized. Neither this specification, nor the claims, are intended to be limited to any type of audio playback apparatus 160 or speaker, or any shape of cutouts 116, specifically reference herein.

The front panel 114 of the housing 110 may also have momentary switch buttons arranged either in a single grouping (as shown in FIG. 1) or separated. These buttons may perform functions such as Soft Power 170, Repeat 172, and Skip 174, explained in more detail below. Any number of such buttons are contemplated, and each may be used for any function.

The housing 110 may have a right-sided panel 118 which allows for access to edges of two rotating dials that are built into the housing 100. The dials are attached to potentiometers with built-in on/off switches, positioned one above the other. One such dial 176 may control the projection brightness of the light-emitting members 130, and a second dial 178 controls the audio volume of the audio playback apparatus 160. Rotating either dial 176 or 178 all the way in a particular direction (for example, clockwise when viewed from the front) turns power completely off to either function. These dials 176 and 178 may alternatively be on a left-sided panel as well; still further, one such dial 176 or 178 may be on one side panel, and the other dial may be on the opposite side panel.

Within a recess on the housing 110 (for example, on a bottom thereof), a switch may be positioned to act as the main physical (or "hard") on/off slide switch to enable or disable power between the device 100 and its batteries. This switch may have multiple positions for the following features. The device 100 is capable of playing all configured stories in at least two different languages, for example either French or English. It is to be noted that any number of languages may be available, and therefore no limit on the number of languages is contemplated. The present specification lists as examples French and English, but any language(s) may be available. Therefore multiple positions of the switch may be configured to select a language from the number of languages available with the device 100. Other functions may also be selectable from such multiple positions of the switch.

The switch also acts, as noted above, as a main power switch. This switch may be recessed into the bottom of the housing 110 to protect the switch and reduce the chance that the switch is accidentally moved to a different setting. Regardless, it is to be understood that this switch may be positioned anywhere on the housing 110 of the device 100.

A pre-recorded track that plays a voice recording with a Concierge/Guiding voice to explain most of the functions and controls may also be provided, in each language configured with the device 100. Such a Concierge/Guiding voice may be played automatically when the main power switch is turned to the "on" position. Regardless, all controls operate in the same manner described herein, but if French is selected as the language, the Concierge/Guiding voice, and all built-in stories, play in French. Conversely, if English is selected, they play in English.

The device 100 may include a headphone jack 182, on a left-sided panel of the housing 110, to allow an external headset or headphone to be plugged in. When such an external device is plugged in, audio is routed to the external device and not routed to the main speaker 116 on the front panel 114. Adjusting the volume using the audio dial 178 on the right-sided panel 118 of the housing 110 also adjusts a volume of the external headset or headphone when it is plugged into the device 100.

As noted above, a dial or scroll wheel 176 on the housing 110 (on the right-side panel 118 in FIG. 1) controls brightness of light 102 emitted by the device 100. Turning the dial 176 up (counterclockwise) increases brightness, and turning the dial 176 down (clockwise) decreases brightness. The brightness can be turned all the way to OFF, and the dial 176 may emit a click sound to indicate it is OFF.

Similarly, a dial or scroll wheel 178 on the housing 110 (again, on the right-side panel 118 in FIG. 1) controls volume of sounds emitted by the device 100. Turning the dial 178 up (counterclockwise) increases volume, turning the dial 178 down (clockwise) decreases volume. The volume can be turned all the way to OFF, and the dial 178 may emit a click sound to indicate it is OFF. It is to be noted that dial rotations for each dial 176 and 178 may be reversed, in other words counterclockwise.

If headphones are plugged in, the internal speaker is deactivated and headphones are active. The headphone jack 182 may be any size, for example a 2.5 mm or a 3.5 mm headphone jack, and may be positioned anywhere on the housing 110; in FIG. 1, this headphone jack is indicated on the left side panel but not seen. If headphones are plugged into the headphone jack 182, the audio goes to the headphones, and not to the audio speaker 160 and heard through the cutouts 116 on the front panel 114. The volume control adjusts either the headphones or the audio speaker 160, depending on which one is active.

If any setting is selected, such as a story, a nature sound, a melody, or a repeating group of sounds, the device 100 plays for the amount of time described for each setting. If no controls are touched for a certain amount of time (for example, 5 minutes) the device 100 automatically shuts off (switches to a Sleep mode). If the device 100 is in use, and the user presses the Pause button 142 during any function, the device 100 stays on pause for 5 minutes, then shuts off.

The device 100 may be powered by a built-in, lithium ion battery pack, which may be charged via a USB port. For example, a cable with a full-size USB A-Male connector on the one end, and a USB Mini C connector on the other end, may be provided with the device 100 to couple to a wall adaptor or other USB power source.

A rear face or panel of the housing 110 may have a Mini-C port (or the like) to plug in such a cable. An indicator LED may also be included, which illuminates in, for example, the color RED while the device is charging and GREEN when charging is complete.

For each of the voice recordings (both for stories and the instructional Concierge/Guiding voice) stored in the device 100, one recording is in one of the languages provided, and another in the other language provided (for example, one recording in French, and one recording in English). Users may be able to select either English or French on the main power slide switch on the bottom of the housing 110 as described above. The bottom of the housing 110 may also have safety icons, engraved batch identification and any other markings required for safety testing.

The device 100 may include a permanent memory storage for performing the various functions thereof, which is not erased when the power is turned off or when user changes the switch on or off or between languages. The user is able to record four custom stories in each language (or eight in a single language), and those are stored in built-in memory on board the device and not capable of being accidentally erased.

This permanent memory storage may comprise sufficient memory to store the following exemplary data:

36 mono audio stories, around 5-6 minutes each, MP3 files, in English (approx. 216 MB)

36 mono audio stories, around 5-6 minutes each, MP3 files, in French (approx. 216 MB)

4 user-recorded stories; around 8 minutes each, MP3 files in English (56 MB)

4 user-recorded stories; around 8 minutes each, MP3 files in French (56 MB)

set of "Concierge Voice" recordings, around 1 min, total, in English (approx. 3 MB)

set of "Concierge Voice" recordings, around 1 min, total, in French (approx. 3 MB)

8 melodies, around 4 minutes (the same melodies in both languages; approx. 20 MB)

8 nature sounds, around 2 minutes (the same sounds in both languages; approx. 20 MB)

It is to be understood that these data requirements and file formats are examples only, and some of these values are approximations. Therefore, the data requirements and file formats may change or be different. Therefore, other numbers of stories, melodies, and recordings, and lengths of each, are also possible and within the scope of the present invention. Accordingly, the memory built into the device 100 may comprise different sizes to accommodate different requirements, for example where more than four user-recorded stories in each language are possible.

The device 100 may also include removable memory, either in addition to or instead of permanent memory. Removable memory may allow the user to install additional memory components as desired by the user, and also to record stories on memory components that can be added and removed by the user as desired. Accordingly, the present invention is not to be limited to any specific type of memory configured with the device 100.

Figure 2:
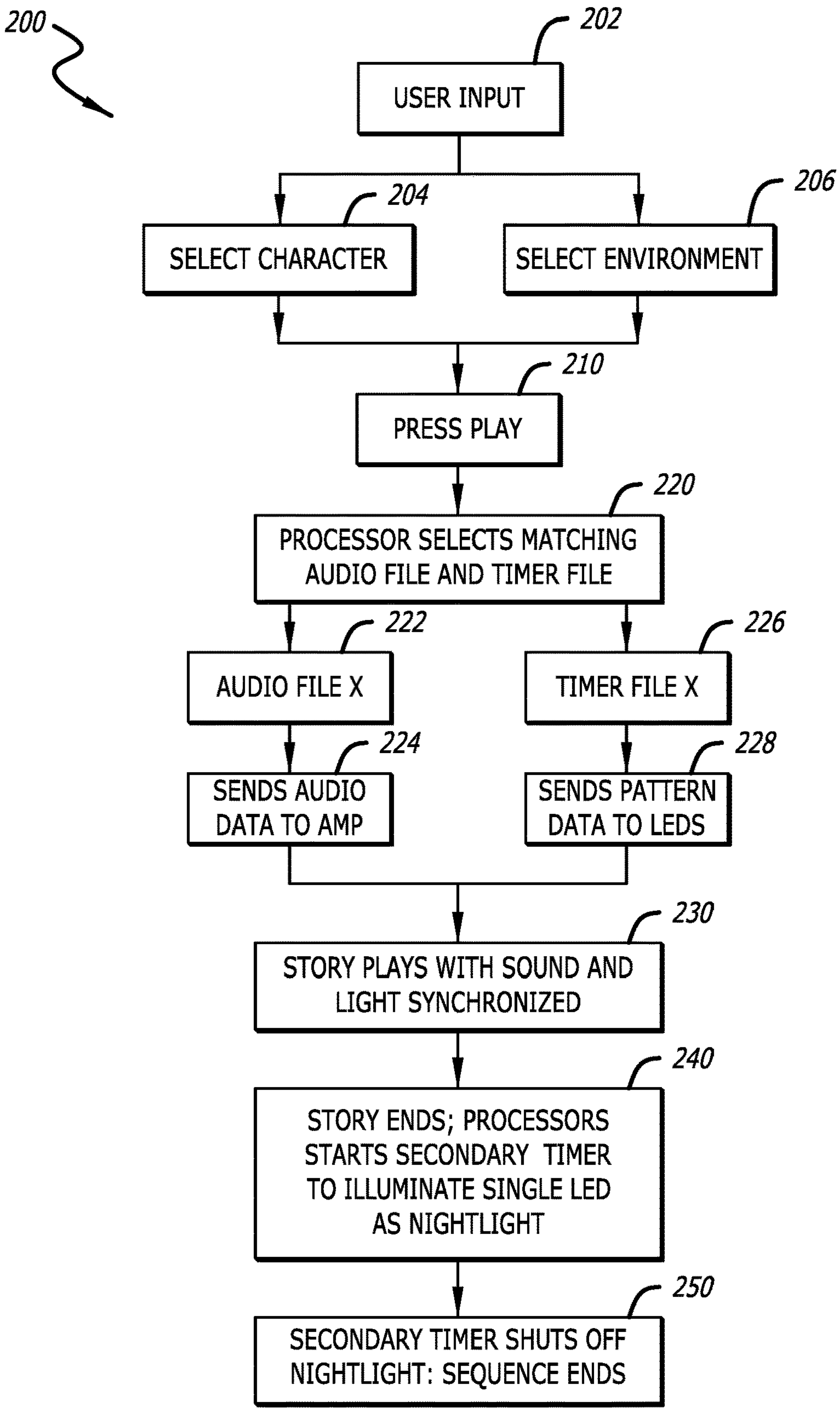
FIG. 2 is a flow diagram illustrating a sequence of operation of the device of FIG. 1, according to the present invention.

FIG. 2 is a flow diagram illustrating steps in a process 200 for operation of the device 100 of the present invention. Note that the operation of the device 100 may be performed in the same manner in any language selected by a user.

The process 200 for operation begins as indicated in step 202, when the user provides input to the device 100. This includes turning the device 100 on using the slide switch located on the bottom of the housing 110 to select one of the available languages. It also includes selecting both a character in step 204, and an environment 206, using the knobs 150 and 152 on the front panel 114 of the housing 110. As noted above, and as shown in FIG. 1, the front panel 114 of the housing 110 has a speaker grill or cutout 116 for emitting sound, a left rotating knob 150 with twelve positions and having a Record button 140 configured therein, a right rotating knob 152 with four positions and having a Play/Pause button 142 configured therein, and one or more buttons grouped together for various functions such as Soft Power 170, Repeat 172, and Skip 174. The front panel 114 may also include a small opening to allow sound to reach an internal microphone 180, so that users can record their own stories.

Selection of characters and environments for recorded stories at steps 204 and 206 are as follows. Using the left-sided rotating knob 150 on the front panel 114 of the housing 110, the user selects one of the available options. In one embodiment, these include nine available character options shown as character icons 155, and three available sound options shown as nature sounds icons 157, and melodies 158. Examples of those available character options are:

Little Girl (Emma)
Little Boy (Arthur)
Turtle
Sheep
Unicorn
Dragon
Lion
Elephant
Fawn While the available sound options are:

Melodies
Nature Sounds
Record a Story

As the user turns either of the left-sided or right-sided knobs 150 and 152 to any position, a built-in voice recording may state the new, combined selection. For example, if the left-sided knob 150 is on "Dragon" and the right-sided knob 152 is on "Forest" and the left-sided knob 150 is changed to "Turtle" icon, the voice recording may immediately say "The Turtle in the Forest."

Using the right-sided rotating knob 152, the user may select one of several different environment/lighting options. In one embodiment, those options are:

Forest: projects a leaf pattern in GREEN
Town/Village: projects small houses/castles in RED
Ocean/Beach: projects fish and wave shapes in BLUE
Space/Stars: projects stars and a moon/planet in AMBER It is to be understood that these are examples only, and that any LED color may be assigned to an environment. The present invention is therefore not to be limited by any specific association of a color with an environment above, or indeed any specific color mentioned.

When the user selects an environment, the voice recording confirms the total selection by saying: "The Turtle in the Forest," or "The Turtle at the Ocean," etc., and the matching icon (leaf, water drop, etc.) may then illuminate. The voice recording may also be used for sound selections—for example, where Melodies have been selected, the voice recording may say "Melodies of the Forest", "Melodies of the Ocean", (or the like), etc.

The "Concierge Voice" recording may also be used to make the device 100 easier to use whenever possible. For example, if the user pushes any button in a repeated way, rapidly (for example, they press the button on the left rotating knob 150 three times in a row), a recorded voice may say "Use the left knob to select a character. Use the right knob to select an environment."

Playback of built-in stories, and activation of synchronized light projections, occurs as follows. The user initiates playback of a recorded story at step 210. When the user is ready to play a recorded story, the user may be able to initiate the playback using the (soft) power button 170 on front panel 114. This triggers one or more of the following events: 1) a start-up tone plays; 2) the logo on the front panel 114 illuminates for several seconds (for example, 3 seconds), and 3) the smaller light-emitting members around both of the knobs 150 and 152 illuminate, one after the other in a "chase" pattern (this may occur, for example, counter-clockwise and two times (two revolutions)). The LEDs on the right-sided knob 152 (where there are fewer (for example, only 4) LEDs) may rotate more slowly than those around the left-sided knob 150 (where there are more (for example, 12) LEDs as in FIG. 1) so that both knobs 150 and 152 finish their rotation cycle(s) at the same time. As soon as the two cycles end, all LEDs surrounding the knobs 150 and 152 illuminate for one second, then go off, except for two of the LEDs. After these LEDs "cycle" for appearance, if the device 100 was powered off using the soft power button 170, the device 100 may still remember the last character and environment selected. The device 100 illuminates the two corresponding LEDs to the last selected character and environment. If the device 100 was turned off with the "hard power" switch on the bottom of the housing 110 and memory of the last selected character and environment was lost, the device 100 may illuminate default story setting icons.

If the user selects for example the "Little Girl" icon using the left-sided rotating knob 150, and the "Forest" icon on the right-sided rotating knob 152, he or she then presses either the "Play/Pause" button within the right-sided rotating knob 152, or the button within the left-sided rotating knob 150 (in other words, pressing either of the left-sided rotating knob 150 or right-sided rotating knob 152 activates the "Play/Pause" function). The device 100 plays a story about a little girl, which starts in the forest, and the green, forest-pattern LED projection illuminates. If, during the story, the location of the story changes from "Forest" to "Ocean", the "Forest" projection slowly goes off while the "Ocean" projection comes on to replace it. Therefore, as each of the stories plays, the light projection changes, in time synchronization with the story, and with specific points and actions in the story.

The device 100 also includes at least one on-board central processing unit 190 (comprised of at least one computer or microprocessor or microchip) as shown in FIG. 3. Within such an on-board central processing unit 190, a set of instructions are encoded that, when executed, determine which light-emitting members 130 illuminate and when they change during each story. At step 220, the central processing unit 190 (which may also be referred to as a processor herein) selects a matching audio file 222 and a timer file 226.

The device 100 sends an audio signal comprising audio data 224 within the audio file 222 to an amplifier, and sends a timer track signal comprising pattern data 228 within the timer file 226 to the plurality of light-emitting members 130. The timer track signal is encoded within the central processing unit 190 to control the illumination color selection and timing for one or more recorded stories, so that light 102, emitted from each light-emitting member 130, is synchronized with each audio file. The selected story then plays at step 230 with both sound and light synchronized by the central processing unit/processor 190 from the data within the audio signal and the timer track signal.

The following further explanation illustrates this approach. A timer track is created for each of the 36 stories. For example, if the user selects story #6, the device 100 starts the story #6 audio file, and simultaneously starts timing track #6, that is encoded within the at least one central processing unit 190 and is not a part of the audio file. In this case, if the story reaches a point where there is a light change, the time of the change is noted: if the story says that the light changes at 42 seconds, the timer track (which was started simultaneously) changes the LED projection at exactly 42 seconds.

In a further embodiment of the present invention, despite the stereo audio having a left channel and a right channel, the recorded stories are played in mono (single channel) so that one of the right or left channel is used, thus leaving the other channel unused. This enables audio to be encoded on one of the channels (for example, the left channel) and non-audible cues/signals encoded in the other channel (in this example, the right channel), where these non-audible cues or signals trigger changes in the projected pattern of emitted light.

The following example serves to illustrate this further embodiment. If, at 30 seconds into a story, the audio file playing in the left channel tells the user that the character has walked out of the woods and into a town, on the right channel an electrical signal is encoded that tells the device 100 to switch from the "Woods" projection LED to the "Town" projection LED. This further embodiment ensures that the light changes stay synchronized with the stories, since the left and right channels are in the same audio file, and therefore always stay in synch with each other.

Regardless of the approach used to synchronize sound and light in the playback of recorded stories on the device 100, at step 240 when any story ends, the processor 190 starts a secondary timer that illuminates a single one of the light-emitting members 130 as a nightlight. Regardless of what light was illuminated at the end of the story (because the emitted light 102 changes during a story, some "Forest" stories might end with the "Ocean" light on, etc.), the device 100 then switches to the LED projection that matches the story that played last in a nighttime playback mode. If the story was a "Star" story, when the story ends it switches to the "Star" projection, etc. This mode includes a timer such that the final projection pattern then stays on for a set time (for example, for 15 minutes). The pattern may be configured to remain at 100% brightness for 14 minutes, then in the last minute, the brightness decreases slowly then it turns off at 15 minutes.

If the user was listening to four stories in a "Story Repeat" mode, the final projection light changes to match the environment of the last story, but then the projection only stays on for set amounts of time—for example, 5 minutes: 4 minutes at 100% brightness, then 1 minute of decreasing brightness to zero light at 5 minutes. At step 250, the secondary timer shuts off the nightlight and the sequence of playback of light and sound ends.

FIG. 3 is a perspective view of internal components of the device 100, and FIG. 4 is top view of internal components of the device 100, according to one embodiment of the present invention. In this view of the device 100, the audio speaker 160 is shown positioned between two center-most cones 132, and underneath a top of each of the two center-most cones in the plurality of cones. FIG. 3 also illustrates exemplary positioning of light-emitting members 130 relative to projector domes 120 and inner cones 132. FIG. 5 is a view of the device 100 of the present invention in operation and when placed in a room 106. FIG. 5 shows the emitted light 102 projected onto walls and a ceiling 104 of a room 106.

Examples of Playback of Recorded Stories

Playback of recorded stories, and operation of the device 100, may be further explained as follows. Referring to FIG. 1, and as noted above, the housing 110 of the device 100 includes one or more actuators for performing specific story playback functions. These may be incorporated into the housing 110 as buttons within the left-sided and right-sided knobs 150 and 152, or may be smaller, distinct buttons that are not capable of being turned. Regardless, in one embodiment, pressing either of button 140 (within the left-sided rotating knob 150) or button 142 (within the right-sided rotating knob 152) performs a PLAY/PAUSE function. For example, the user presses the button 142 of the right-sided knob 152 to actuate the Play/Pause button to start a recorded story. If the user presses the Play/Pause button 142 again (or, the button 140 on the left-sided rotating knob 140) while the recorded story is playing, it pauses. If they press either button 140 or 142 again, the recorded story resumes. If the light projection is on when the Play/Pause button is pressed, the selected light stays on.

Another button 172 on the front panel activates a REPEAT mode. If the user presses the Repeat 172 button while a story is playing, the device 100 goes back to the beginning of the story currently playing and starts it over.

If the user selects a character, then an environment, and does not press Play/Pause 142, but instead presses the Repeat button 172, the voice recording says "Play all four adventures." The device 100 waits for two seconds, and then all four stories associated with the selected character play, starting with the environment selected. For example, if the user selected the "Lion," then selected the "Forest," and then pressed the Repeat button 172, the voice recording would say "Play all four adventures." The device 100 then waits two seconds, then plays the story of the Lion in the Forest, the Lion in the Town, The Lion in the Ocean, and the Lion under the Stars.

If the device is playing four stories in this Repeat mode, and the user presses the Play/Pause button 142 on the right-sided knob 152, it pauses the current story but does not switch out of Repeat mode. If the user presses the Play button 142 again, it resumes the story, and continues with the group of four stories. If the user presses the Repeat button 172 while the device 100 is in Repeat mode, the device 100 repeats the current story and then keeps playing the rest of the stories in the chosen list (same character).

The selected story plays to the end; when the last of the four stories ends, the emitted light 102 changes to the environment that matches the last story. For example, a Star pattern if a Star story, and a Forest pattern if a Forest story. That light pattern then stays illuminated for set amounts of time—for example, 5 minutes: 4 minutes at 100% brightness, then 1 minute of decreasing brightness to zero light at 5 minutes.

Another button 174 on the front panel 114 of the housing 110 performs a SKIP function. If the user presses this Skip button 174, the device 100 moves to the next story in the same list (same character).

If the user turns either of the left-sided knob 150 or the right-sided knob 152 while a story is playing, the current story stops, and the Concierge/Guidance voice recording announces the new selection.

The audio files include, in addition to stories, recorded music. The device 100 may have many sound files of recorded music stored in its permanent memory. If the user selects the "Music Note" icon on the left-sided rotating knob 150, the voice recording says "Melodies." The user may then select one of the four environments with the right-sided rotating knob 152.

In one exemplary embodiment, there are eight melodies for the four environments. Only two melodies are assigned to each environment. For example, if the user selects the "Music" note on the left-sided rotating knob 150, then selects "Ocean" on the right-sided rotating knob 152, the two sounds there might be "Dolphin Dreams" and "Brahms Lullaby." If the user presses the Play/Pause button 142 on the right-sided knob 152, the device 100 plays the first of the two sounds: "Dolphin Dreams," in this example. The Dolphin melody then plays and loops for 20 minutes, then shuts off. It is to be noted that the number of melodies and the number assigned to each environment, may change, and therefore the present invention is not to be limited to any specific number of each mentioned herein.

If the user presses the Skip button 174 when the device 100 is playing a melody, the device 100 advances to the second music track assigned to the environment selected by the right-sided rotating knob 152. In this example, it would play the "Brahms" melody. If that second melody is selected immediately or if the user presses the Skip button 174 to advance to that melody, the timer resets so that the second track also plays for 20 minutes. If the user presses the Skip button 174 a third time, the device 100 skips back to the first melody.

Because two melodies are assigned to each environment, the user turns the right-sided rotating knob 152 to one of the other environments in order to access each of the other pairs of melodies, up to the total of eight melodies in this exemplary embodiment. The Skip button 174 operates in the same manner in each environment.

If the Repeat button 172 is pressed during playback of melody, the timer is reset. For example, if the user has listened to 15 minutes of music and only has 5 minutes left and presses the Repeat button 172, its timer resets and plays 20 minutes of the same melody.

The audio files stored on the device 100 also include, as noted above, nature sound files in addition to melodies. The device 100 may have many such nature sound files stored in permanent memory. If the user selects "Nature Sounds" with the left-sided rotating knob 150, the voice recording says "Nature Sounds." The user may then select an environment using the right-sided rotating knob 152.

In one embodiment, there are eight nature sounds for the four environments. Only two nature sounds are assigned to each environment. For example, if the user selects Nature sounds with the left-sided rotating knob 150, then selects "Forest" with the right-sided rotating knob 152, the two sounds there might be "Wind" and "Rustling Leaves." If the user presses the Play/Pause button 142 on the right-sided knob 152, the device 100 plays the first of the two sounds: "Wind," in this example. The wind sound then plays in a loop for 20 minutes. It is to be noted that the number of nature sounds, and the number assigned to each environment, may change, and therefore the present invention is not to be limited to any specific number of each mentioned herein.

If the user presses the Skip button 174 when Nature sounds are playing, the device 100 advances to the second Nature sound assigned to the environment selected by the right-sided rotating knob 152. In this example, the device 100 would play the "Rustling Leaves" sound. If that second sound is selected immediately or if the user presses the Skip button 174 to advance to that sound, the timer is reset so that the second sound also plays for 20 minutes. If the user presses the Skip button 174 a third time, the device 100 skips back to the first sound.

In this embodiment, because two Nature sounds are assigned to each environment, the user would need to turn the right-sided rotating knob 152 to one of the other environments in order to access each of the other pairs of Nature sounds. The Skip button 174 operates in the same manner in each environment.

If the Repeat button 172 is pressed during playback of any Nature Sound, the timer is reset. For example, if the user has listened to 15 minutes of Nature Sounds and only has 5 minutes left and presses the Repeat button 172, its timer resets and plays 20 minutes of the same Nature Sound.

It is to be noted that for both melodies and nature sounds, the Repeat mode of the device 100 may also perform the following function for playback of such files. If the user presses the Repeat button 172 before they press the Play button 142 on a set of either melodies or nature sounds, when they do press Play 142, the device 100 plays (for example) Nature Sound 1 (in the selected environment) for 15 minutes, then automatically switches to sound #2 in that environment which also plays for 15 minutes, for a total of 30 minutes. The device 100 performs this behavior in any environment in its Repeat mode.

Recording Custom Stories

The following provides an exemplary discussion of how users may record custom stories with the device 100.

As noted above, in addition to playing pre-recorded stories, the device 100 is also capable of allowing users to record their own custom stories. The device 100 allows users to record and store four custom stories for each language offered, each of which may be up to a certain length, for example up to eight minutes long. If the user selects the "Book" icon 141 on the left-sided knob 150, the voice recording says "Your Stories." The user may then select one of the four environments with the right-sided rotating knob 152 and the voice recording confirms the selection ("The Forest," "The Ocean," etc.).

The device 100, as noted above, also includes a built-in microphone 180. This may be configured anywhere on the housing 110; for example, on the left side of the front panel 114 with a small hole to allow sound to reach it. The microphone 180 is activated only when making a story recording in the manner described herein.

The process of recording a custom story is as follows. The user turns the left-sided sided rotating knob 150 to the "Book" icon 141; the voice recording then says "Your Story in the Village," etc. (depending on the position of the right-sided rotating knob 152). The user then turns the right-sided rotating knob 152 to the environment where they want to store the new story; for instance, the Forest. The voice recording then confirms "Your Story in the Forest." If the user then presses either the Record/Microphone button 140 on the left-sided knob 150 or the Play/Pause button 142 on the right-sided knob 152 individually, the voice recording may say, for example: "To make a custom recording, press both the Microphone Button and the Play buttons at the same time. Press either button to stop recording. Your story must be shorter than 8 minutes."

The user then presses both left (Record/Microphone) and right (Play/Pause) buttons 140 and 142 simultaneously. The device 100 emits a "beep" sound one time to confirm that recording has started, and the device 100 begins the recording. The user can then release both buttons 140 and 142 and the device 100 keeps recording. In this manner, the user does not have to hold both buttons 140 and 142 the entire time they read a new story.

Then the user reads or just speaks their story into the microphone 180. For each story, the device 100 may record for up to 8 minutes; this is an exemplary number however, and it is to be understood that the present invention is not to be limited to a recording time with a maximum of 8 minutes. If the user is still recording at 7 minutes and 40 seconds, all four light-emitting members 130 illuminate, then go "OFF" one at a time to count down the remaining time. For example, at the 7:40 mark all four light-emitting members 130 illuminate: at the 7:45 mark the blue light-emitting member 130 goes OFF; at the 7:50 mark the red light-emitting member 130 goes OFF, at the 7:55 mark the amber light-emitting member 130 goes off, and at exactly 8 minutes, the last (green) light-emitting member 130 goes off and the recording stops. The voice recording then states: "Your Story must be shorter than 8 minutes."

It is to be understood that this sequence of colors turning off may vary, and the colors may turn off in any order. It is to be further understood that the exact words recorded and played back by the voice recording may also vary, in this instance and in every instance where such playbacks of voice recordings are discussed in this specification, and the present invention is therefore not to be limited by any such sequence or exact words used.

When the user has finished their custom story, if the user presses either the Record/Microphone button 140 or the Play/Pause button 142, the device 100 stops recording. The device 100 emits a "beep" sound twice to confirm that the recording was saved.

Custom stories recorded by users are played back in the following manner. Once a recording of a custom story is saved, if the left-sided rotating knob 150 is set to the Book icon 141, and the right-sided rotating knob 152 is set to Forest icon, and user presses the Play/Pause button 142, the device 100 plays the custom story recorded in that memory slot. The voice recording may also say, "Your story in the Forest." Each of the custom stories are saved and accessed only in the environment selected when the story was saved. There is to be one forest story, one ocean story, etc. The user can therefore record one story for each environment, up to four custom stories, total, for each language.

When any of those four custom stories are played back, the device 100 illuminates the pattern associated with that environment, and that light-emitting member 130 stays illuminated during the entire story. If Forest is selected, the device 100 plays the forest story and illuminates the Green/Leaves projection during the story.

After the custom story ends, the audio stops but the lights switch to a random built-in pattern which is preprogrammed and not related to any story. That new pattern plays for 15 minutes after the story ends, and then the light shuts off, just as with the pre-recorded stories.

If the Skip button 174 is pressed during the playback of a user-recorded story, the current story playback ends and the device 100 plays the user-recorded story in the next environment. For example, if the user is listening to a recorded story in the Star environment and presses the Skip button 174, the device 100 switches to the recorded story in the Forest environment. If the device 100 is set to the Book icon 141 and an environment, and the user presses the Repeat button 172 BEFORE pressing the Play/Pause button 142, the voice recording says "Play all four adventures," the device 100 waits two seconds, then plays all four custom stories in a row, starting with the one selected. These Repeat and Skip buttons 172 and 174 may not work when the left-sided rotating knob 150 is set to the Book icon 141 if no stories are recorded.

It is to be understood that many other alternative designs for the various functions of the device 100 of the present invention are possible, and therefore other embodiments thereof are possible and within the scope of the present specification.

For example, patterns of emitted light 102 may be projected onto ceiling or wall 104 (or anywhere within an environment or room 106 in which the device 100 is placed) by using a flat piece of film within the housing 100 with a clear image of the pattern(s) on it. One or more convex lenses (or other type of lens(es)) to focus the pattern onto the ceiling or wall 104 may also be utilized.

It is to be understood that light 102 that is emitted from the housing 110 of device 100 may comprise one or more pictures (as noted above), such as for example images depicting scenes in a recorded story, instead of specific patterns. Such pictures may change as the recorded story plays, thereby providing an illustration of the recorded story. Such one or more pictures may be configured with either the projector domes 120, or with piece of film and lens(es) as described above. Regardless, it is to be understood that neither the present specification nor the claims are to be limited to a pattern of emitted light 102. Such emitted light 102 may therefore comprise any form, including (but not in any manner limited to) static or dynamic patterns and static or dynamic pictures or other illustrations.

The projector domes 120 (or other components allowing for projection of light 102 emitted by the light-emitting members 130, as discussed above) may have the shape of lenses, such that they are capable of projecting either static or dynamic patterns, or static or dynamic pictures or illustrations, or both. In one embodiment, the device 100 may include multiple lenses that serve as such components, with interference patterns molded into each. In an example of such an embodiment, each projector component has two lenses. An inner lens tilts and rotates in a way that mimics the motion of water. Emitted light 102 gets distorted while passing through the inner lens, then gets distorted further when passing through the outer lens, which has a second interference pattern thereon. The interference patterns themselves, and the distance between the two lenses, produce a realistic effect of motion, for example moving water, together with an illusion of depth.

In still a further example of an alternative design, regarding synchronization of light 102 with recorded stories, the timer track may comprise a separate electronic timer, triggered by the central processing unit 190, that functions to synchronize the light 102 with recorded stories. In still a further example, the central processing unit 190 may be configured with sufficient computing power (or coupled with a wired or wireless, internet-enabled network to external computing environments with additional computing power, such as cloud computing environments), to listen for key words or sounds in audio files and change the emitted light 102 only when it identifies those specific keywords. In such an example, audio speech recognition algorithm(s) may control the patterns of emitted light 102, instead of a timer, to allow for synchronization with recorded stories. Audio or speech recognition algorithm(s) may also be embodied in, and/or include, one or more artificial intelligence or machine learning tools (for example, one or more neural networks, and/or one or more large language models) that are developed, trained, applied, and/or implemented to recognize specific keywords (for example, in user-recorded stories) for synchronization of emitted light 102.

In one or more embodiments, the present invention may be styled as follows

1. A device, comprising:
   a housing, having a clear top portion;
   a plurality of projector domes positioned within the clear top portion;
   a plurality of light emitting members that emit light from within the housing, wherein under each projector dome, one or more light-emitting members are positioned;
   a plurality of cones, each cone surrounding at least one light emitting member so that the light from within the housing and from the plurality of light-emitting members only illuminates the projector dome under which the one or more light-emitting members are positioned;
   an audio speaker; and
   a central processing unit within the housing, the central processing unit controlling the plurality of light-emitting members and the audio speaker,
   wherein the light is projected from within the housing by the plurality of light emitting members and from each projector dome in synchronization with an audio playback of one or more recorded stories through the audio speaker, and at one or more specific points within each of the one or more recorded stories, for each light emitting member.

2. The device of claim 1, wherein each projector dome has one or more clear areas, and one or more areas coated with an opaque material, so that light emitted from within the housing only passes through the one or more clear areas but not through the one or more opaque areas.

3. The device of claim 2, wherein each projector dome has a particular pattern printed on a surface thereof, such that the particular pattern is projected from the housing when the one or more light emitting members under each projector dome is illuminated and the light passes through the one or more clear areas.

4. The device of claim 3, wherein each projector dome rotates in a time synchronization with sounds emitted from the audio speaker to create additional effect in the particular pattern that is projected when the light emitting member under each projector dome is illuminated.

5. The device of claim 1, wherein the light emitted from within the housing passes through the clear top portion of the housing and is projected onto a surface within an environment in which the device is placed.

6. The device of claim 1, further comprising multiple selector knobs on the housing for actuating the audio playback of one or more recorded stories, wherein one selector knob enables selection of a character, a story, a melody and a nature sound, and another selector knob enables selection of an environment for the character, the story, the melody and the nature sound, and wherein each recorded story comprises a selected one of the character, the narrative, the melody and the nature sound within a selected environment.

7. The device of claim 1, wherein a timer track signal is encoded on the central processing unit, the timer track signal controlling the light emitted from each light-emitting member.

8. The device of claim 1, wherein the audio playback of the one or more recorded stories in synchronization with the light emitted from each light-emitting member is controlled by a signal encoded on an un-used channel of an audio signal that includes the one or more recorded stories.

9. The device of claim 8, wherein each cone has a particular characteristic on an inside surface thereof that prevents the light from passing through a side of each cone, and also prevents the light from reflecting from the inside surface and from being emitted outside a top of the cone.

10. The device of claim 9, wherein the particular characteristic on the inside surface of each cone is a matte finish that reflects less light and blocks the light from passing through a side of each cone.

11. The device of claim 1, wherein the audio speaker is positioned between two center-most cones in the plurality of cones, and underneath a top of each of the two center-most cones in the plurality of cones.

12. The device of claim 1, wherein each cone has a height of between 1.8 cm and 2.2 cm, each projector dome has a height of between 1.1 cm and 1.5 cm, and each projector dome attaches directly above each cone, such that a top of each light-emitting member is approximately 3 cm from an inside surface of a top each projector dome.

13. A child's toy, comprising:
   a processor;
   a light-emitting apparatus within a housing, having a plurality of projector domes, a plurality of light-emitting members, and a plurality of cones, wherein under each projector dome, one or more light-emitting members are positioned, and each cone surrounds at least one light emitting member so that the light from the plurality of light-emitting members only illuminates the projector dome under which the one or more light-emitting members are positioned; and
   an audio playback apparatus coupled to the processor and the light-emitting apparatus, such that the processor controls both the plurality of light-emitting members and the audio playback apparatus, wherein the light is projected by the plurality of light emitting members from each projector dome through a clear top portion of the housing in synchronization with an audio playback of one or more recorded stories, and at one or more specific points within each of the one or more recorded stories for each light emitting member, and so that at one or more specific points within each of the one or more recorded stories, the light, colors, and timing of the plurality of light-emitting members change in synchronization with actions in the one or more recorded stories.

14. The child's toy of claim 13, wherein each projector dome has one or more clear areas, and one or more areas coated with an opaque material, so that the light emitted by the plurality of light-emitting members from within the housing only passes through the one or more clear areas but not through the one or more opaque areas.

15. The child's toy of claim 14, wherein each projector dome has a particular pattern printed on a surface thereof, such that the particular pattern is projected only when the light emitted by one or more light emitting members under each projector dome passes through the one or more clear areas.

16. The child's toy of claim 15, wherein each projector dome rotates in a time synchronization with sounds emitted from the audio playback apparatus to create additional effect in the particular pattern that is projected when the light emitting member under each projector dome is illuminated.

17. The child's toy of claim 13, wherein the light emitted from the housing passes through a clear top portion and is projected onto a surface within an environment in which the child's toy is placed.

18. The child's toy of claim 13, further comprising multiple selector knobs on the housing for actuating the audio playback of one or more recorded stories, wherein one selector knob enables selection of a character, a story, a melody and a nature sound, and another selector knob enables selection of an environment for the character, the story, the melody and the nature sound, and wherein each recorded story comprises a selected one of the character, the narrative, the melody and the nature sound within a selected environment.

19. The child's toy of claim 13, wherein a timer track signal is encoded on the processor, the timer track signal controlling the light emitted from each light-emitting member.

20. The child's toy of claim 13, wherein the audio playback of the one or more recorded stories in synchronization with the light emitted from each light-emitting member is controlled by a signal encoded on an un-used channel of an audio signal that includes the one or more recorded stories.

21. The child's toy of claim 13, wherein each cone has a particular characteristic on an inside surface thereof that prevents light from passing through a side of each cone, and prevents the light from reflecting from the inside surface and from being emitted outside a top of the cone.

22. The child's toy of claim 13, wherein the particular characteristic on the inside surface of each cone is a matte finish that reflects less light and blocks the light from passing through a side of each cone.

23. The child's toy of claim 13, wherein the audio playback apparatus includes an audio speaker within the housing.

24. The child's toy of claim 23, wherein the audio speaker positioned between two center-most cones in the plurality of cones, and underneath a top of each of the two center-most cones in the plurality of cones.

25. The child's toy of claim 13, wherein each cone has a height of between 1.8 cm and 2.2 cm, each projector dome has a height of between 1.1 cm and 1.5 cm, and each projector dome attaches directly above each cone, such that a top of each light-emitting member is approximately 3 cm from an inside surface of a top each projector dome.

The foregoing descriptions of embodiments of the present invention have been presented for the purposes of illustration and description. They are not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A device, comprising:

a housing, having a clear top portion;

a plurality of projector domes positioned within the clear top portion;

a plurality of light emitting members that emit light from within the housing, wherein under each projector dome, one or more light-emitting members are positioned;

a plurality of cones, each cone surrounding at least one light emitting member so that the light from within the housing and from the plurality of light-emitting members only illuminates the projector dome under which the one or more light-emitting members are positioned;

an audio speaker; and a central processing unit within the housing, the central processing unit controlling the plurality of light-emitting members and the audio speaker, wherein the light is projected from within the housing by the plurality of light emitting members and from each projector dome in synchronization with an audio playback of one or more recorded stories through the audio speaker, and at one or more specific points within each of the one or more recorded stories, for each light emitting member.

2. The device of claim 1, wherein each projector dome has one or more clear areas, and one or more areas coated with an opaque material, so that light emitted from within the housing only passes through the one or more clear areas but not through the one or more opaque areas.

3. The device of claim 2, wherein each projector dome has a particular pattern printed on a surface thereof, such that the particular pattern is projected from the housing when the one or more light emitting members under each projector dome is illuminated and the light passes through the one or more clear areas.

4. The device of claim 3, wherein each projector dome rotates in a time synchronization with sounds emitted from the audio speaker to create additional effect in the particular pattern that is projected when the light emitting member under each projector dome is illuminated.

5. The device of claim 1, wherein the light emitted from within the housing passes through the clear top portion of the housing and is projected onto a surface within an environment in which the device is placed.

6. The device of claim 1, further comprising multiple selector knobs on the housing for actuating the audio playback of one or more recorded stories, wherein one selector knob enables selection of a character, a story, a melody and a nature sound, and another selector knob enables selection of an environment for the character, the story, the melody and the nature sound, and wherein each recorded story comprises a selected one of the character, a narrative of the story, the melody and the nature sound within a selected environment.

7. The device of claim 1, wherein a timer track signal is encoded on the central processing unit, the timer track signal controlling the light emitted from each light-emitting member.

8. The device of claim 1, wherein the audio playback of the one or more recorded stories in synchronization with the light emitted from each light-emitting member is controlled by a signal encoded on an un-used channel of an audio signal that includes the one or more recorded stories.

9. The device of claim 8, wherein each cone has a particular characteristic on an inside surface thereof that prevents the light from passing through a side of each cone, and also prevents the light from reflecting from the inside surface and from being emitted outside a top of the cone.

10. The device of claim 9, wherein the particular characteristic on the inside surface of each cone is a matte finish that reflects less light and blocks the light from passing through a side of each cone.

11. The device of claim 1, wherein the audio speaker is positioned between two center-most cones in the plurality of cones, and underneath a top of each of the two center-most cones in the plurality of cones.

12. The device of claim 1, wherein each cone has a height of between 1.8 cm and 2.2 cm, each projector dome has a height of between 1.1 cm and 1.5 cm, and each projector dome attaches directly above each cone, such that a top of each light-emitting member is approximately 3 cm from an inside surface of a top each projector dome.

13. A child's toy, comprising:

a processor;

a light-emitting apparatus within a housing, having a plurality of projector domes, a plurality of light-emitting members, and a plurality of cones, wherein under each projector dome, one or more light-emitting members are positioned, and each cone surrounds at least one light emitting member so that the light from the plurality of light-emitting members only illuminates the projector dome under which the one or more light-emitting members are positioned; and an audio playback apparatus coupled to the processor and the light-emitting apparatus, such that the processor controls both the plurality of light-emitting members and the audio playback apparatus, wherein the light is projected by the plurality of light emitting members from each projector dome through a clear top portion of the housing in synchronization with an audio playback of one or more recorded stories, and at one or more specific points within each of the one or more recorded stories for each light emitting member, and so that at one or more specific points within each of the one or more recorded stories, the light, colors, and timing of the plurality of light-emitting members change in synchronization with actions in the one or more recorded stories.

14. The child's toy of claim 13, wherein each projector dome has one or more clear areas, and one or more areas coated with an opaque material, so that the light emitted by the plurality of light-emitting members from within the housing only passes through the one or more clear areas but not through the one or more opaque areas.

15. The child's toy of claim 14, wherein each projector dome has a particular pattern printed on a surface thereof, such that the particular pattern is projected only when the light emitted by one or more light emitting members under each projector dome passes through the one or more clear areas.

16. The child's toy of claim 15, wherein each projector dome rotates in a time synchronization with sounds emitted from the audio playback apparatus to create additional effect in the particular pattern that is projected when the light emitting member under each projector dome is illuminated.

17. The child's toy of claim 13, wherein the light emitted from the housing passes through a clear top portion and is projected onto a surface within an environment in which the child's toy is placed.

18. The child's toy of claim 13, further comprising multiple selector knobs on the housing for actuating the audio playback of one or more recorded stories, wherein one selector knob enables selection of a character, a story, a melody and a nature sound, and another selector knob enables selection of an environment for the character, the story, the melody and the nature sound, and wherein each recorded story comprises a selected one of the character, a narrative of the story, the melody and the nature sound within a selected environment.

19. The child's toy of claim 13, wherein a timer track signal is encoded on the processor, the timer track signal controlling the audio playback of the one or more recorded stories in synchronization with the light emitted from each light-emitting member.

20. The child's toy of claim 13, wherein the audio playback of the one or more recorded stories in synchronization with the light emitted from each light-emitting member is controlled by a signal encoded on an un-used channel of an audio signal that includes the one or more recorded stories.

21. The child's toy of claim 13, wherein each cone has a particular characteristic on an inside surface thereof that prevents light from passing through a side of each cone, and prevents the light from reflecting from the inside surface and from being emitted outside a top of the cone.

22. The child's toy of claim 13, wherein the particular characteristic on the inside surface of each cone is a matte finish that reflects less light and blocks the light from passing through a side of each cone.

23. The child's toy of claim 13, wherein the audio playback apparatus includes an audio speaker within the housing.

24. The child's toy of claim 23, wherein the audio speaker positioned between two center-most cones in the plurality of cones, and underneath a top of each of the two center-most cones in the plurality of cones.

25. The child's toy of claim 13, wherein each cone has a height of between 1.8 cm and 2.2 cm, each projector dome has a height of between 1.1 cm and 1.5 cm, and each projector dome attaches directly above each cone, such that a top of each light-emitting member is approximately 3 cm from an inside surface of a top each projector dome.

* * * * *